United States Patent
Chavez et al.

(10) Patent No.: US 7,617,178 B2
(45) Date of Patent: Nov. 10, 2009

(54) MOVING FILE FRAGMENTS FROM BACKGROUND FILE SHARING TO FOREGROUND FILE SHARING AND PREVENTING DUPLICATE DOWNLOADS

(75) Inventors: Timothy R. Chavez, Austin, TX (US); Christina K. Lauridsen, Austin, TX (US); Sushma B. Patel, Austin, TX (US); Robert R. Peterson, Austin, TX (US); Loulwa F. Salem, Austin, TX (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 11/761,551

(22) Filed: Jun. 12, 2007

(65) Prior Publication Data

US 2008/0133666 A1    Jun. 5, 2008

(51) Int. Cl.
G06F 17/00 (2006.01)
G06F 17/30 (2006.01)
G06F 17/40 (2006.01)

(52) U.S. Cl. ............... 707/1; 709/217; 709/223; 709/238; 709/244; 707/2; 707/10; 707/200

(58) Field of Classification Search ............ 707/1, 707/2, 10, 200; 709/217, 223, 238, 244
See application file for complete search history.

(56) References Cited

U.S. PATENT DOCUMENTS 5,337,044 A * 8/1994 Folger et al. ............ 340/7.1
7,203,741 B2 * 4/2007 Marco et al. ............ 709/223

2001/0037311 A1    11/2001 McCoy et al.
2004/0024766 A1 *  2/2004 Chung .................. 707/10
2005/0203851 A1    9/2005 King et al.
2006/0029093 A1    2/2006 Van Rossum
2006/0167855 A1    7/2006 Ishikawa et al.

(Continued)

OTHER PUBLICATIONS

Clarke et al., Protecting Free Expression Online with Freenet, 2002, IEEE Internet Computing.*

(Continued)

*Primary Examiner*—James Trujillo
*Assistant Examiner*—William Spieler
(74) *Attorney, Agent, or Firm*—Stephen R. Tkacs; Stephen J. Walder, Jr.; Steven L. Bennett

(57) ABSTRACT

In accordance with one illustrative embodiment, when a file is moved from the background to the foreground in a peer-to-peer client, the client makes a local request for file pieces. The client sends a handshake message to itself to check for available pieces. The client then exchanges messages locally the same way it would with external peers. As an alternative approach to local message passing, the client may keep a local record of file fragments in a data structure, such as a markup language document or other data repository. The client may then query the data structure for needed file fragments before submitting a request to the peer-to-peer network. Every time a new file segment is downloaded and validated in the background, or the foreground, the peer-to-peer client may update the data structure. Then, the client may simply query the data structure for the specific segment it wishes to download.

17 Claims, 9 Drawing Sheets

U.S. PATENT DOCUMENTS

2006/0179143 A1 8/2006 Walker et al.
2008/0016194 A1 1/2008 Chetuparambil et al.

OTHER PUBLICATIONS

Cohen, The Bittorrent Protocol Specification, 2008, p. 3.*

Clarke, A Distributed Decentralised Information Storage and Retrieval System, 1999, University of Edinburgh.*

Cohen, Bram, "Incentives Build Robustness in BitTorrent", http://www.bittorrent.com/bittorrentecon.pdf, May 22, 2003, pp. 1-5.

"Swarming Technology", Onion Networks, http://onionnetworks.com/technology/swarming/, 3 pages.

BitTorrent, Wikipedia, http://en.wikipedia.org/wiki/Bittorrent, 14 pages.

Malik, Om, "BitTorrent does legal P2P with NTL", GigaOmniMedia, Inc., http://gigaom.com/2006/02/10/bittorrent-does-legal-p2p-with-ntl/, Feb. 10, 2006, 2 pages.

"Warner Bros. to sell films via BitTorrent", The Associated Press, MSNBC.com, http://www.msnbc.msn.com/id/12694081/print/1/displaymode/1098/, May 8, 2006, 2 pages.

"The Changing Face of BitTorrent", Computer Power User, Caught In The Web, vol. 5, Issue 11, http://www.computerpoweruser.com/Editorial/article.asp?guid=&article=articles/archive/c0511/46c11.asp/, Nov. 2005, 2 pages.

Cooper, Mark, "Lamabox—the P2P Video set-top box", PVR Hardware Database, Jan. 19, 2006, http://pvrhw.goldfish.org/tiki-read_article.php?articleId=59, 2 pages.

"Our goal: to understand protein folding, misfolding, and related diseases", Stanford University, Folding@home distributed computing, http://folding.stanford.edu, 3 pages.

"SETI@home", University of California, 2006, http://setiathome.ssl.berkeley.edu/, 1 page.

"Project RC5", distributed.net, http://www.distributed.net/rc5/, 2 pages.

"BandwidthSwitcher", halfbakery, http://www.halfbakery.com/idea/BandwidthSwitcher#1002577095, 4 pages.

"P2P Internet", halfbakery, http://www.halfbakery.com/idea/P2P_20Internet#1092502800, 3 pages.

Mldonkey, a multi-networks file-sharing client—Tasks: task #4381, Free Software Foundation, Inc., http://savannah.nongnu.org/task/?4381, 6 pages.

"Metainfo File Structure", TheoryOrg, BitTorrentSpecification, Bittorent Protocol Specification v1.0, Section 7, http://wiki.theory.org/BitTorrentSpecification, 19 pages.

* cited by examiner

```
<file>
    <name>John Smith Cellphone Contacts</name>
    <fragment>
        <name>ContactsA-C</name>
        <name>ContactsF-T</name>
        <name>ContactsU-Z</name>
    </fragment>
    <complete>false</complete>
</file>
```
*FIG. 10*
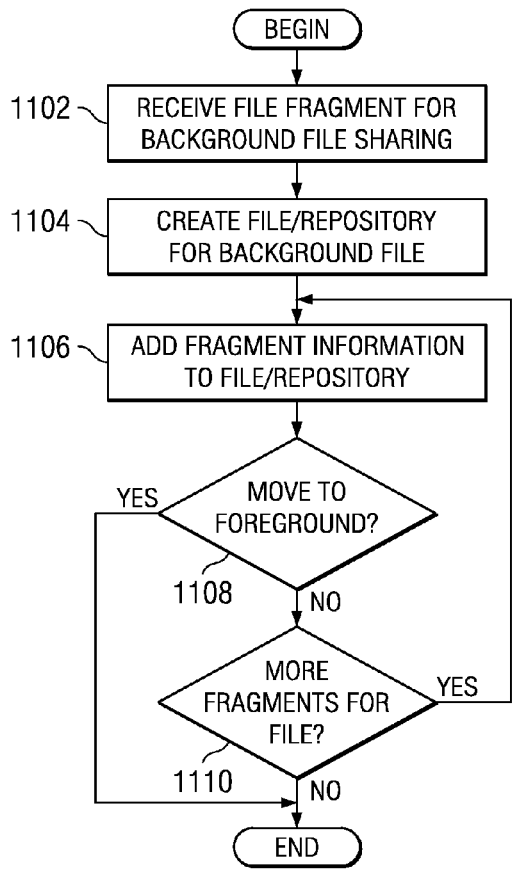
*FIG. 11*
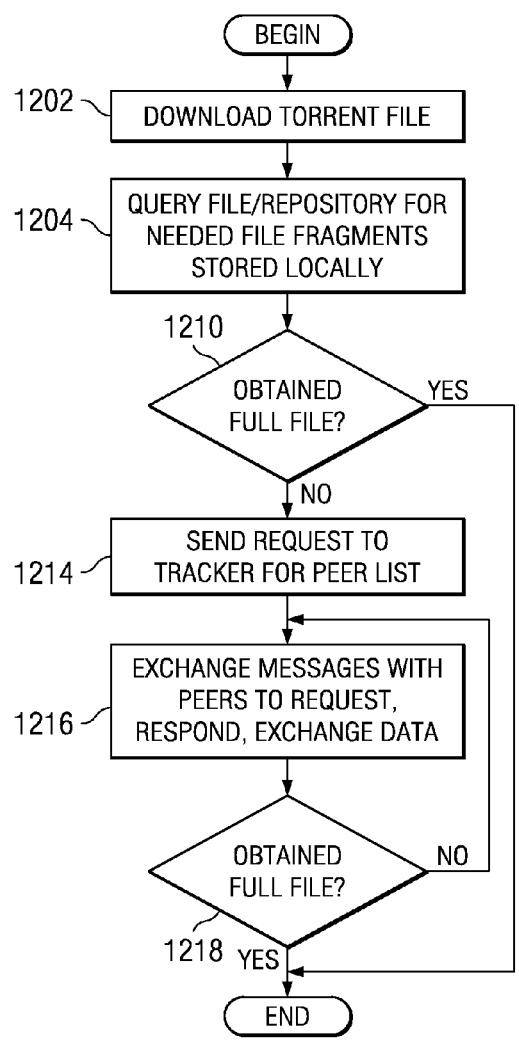
*FIG. 12*

MOVING FILE FRAGMENTS FROM BACKGROUND FILE SHARING TO FOREGROUND FILE SHARING AND PREVENTING DUPLICATE DOWNLOADS

BACKGROUND

1. Technical Field

The present application relates generally to an improved data processing system and method. More specifically, the present application is directed to moving file fragments from background file sharing to foreground file sharing and preventing duplicate downloads.

2. Description of Related Art

Peer-to-peer file sharing programs are designed to widely distribute large amounts of data, while minimizing costly server and bandwidth resources. Peer-to-peer (P2P) systems, such as the BITTORRENT P2P file sharing system, have gained a wide following. P2P systems have recently been put to commercial use through partnerships with content providers, such as media and cable companies. P2P networks are gaining credibility as a means for legal revenue generating activity—creating a need for methods to rapidly optimize content delivery.

In one implementation, a file is made available for P2P download by providing a link to file information, often stored on a hypertext transport protocol (HTTP), or Web, server. In the BITTORRENT file sharing system, this file information is referred to as a "torrent." The file information may include, for example, file name, file length, and hashing information.

The file information may also include the address of a tracker, which is a device in the P2P network that helps downloaders (peers) to find each other. Peers communicate with the host of the file information and the tracker using a simple protocol layered on top of HTTP. Each peer sends information about what file it is downloading, on what port it is listening, and other information. The tracker responds with a list of contact information for peers that are downloading the same file. However, the communication between a peer and a tracker requires much less bandwidth than a direct server-to-client file download.

In a typical P2P implementation, a file is divided into pieces of fixed size, e.g., 256 KB. Each downloader reports to its peers what pieces it has. Also, each downloader, at some point, uploads file pieces, also referred to as segments or fragments, to its peers. Whenever, a downloader finishes downloading a file fragment, the P2P client software performs a hash of the file fragment and compares the hash to an expected hash value, received in the file information, to determine if the file fragment downloaded correctly and has not been corrupted. If the file fragment downloads correctly, then the client reports to its peers that it has the file fragment available for upload.

At least one peer must start with the whole file. This peer is referred to as a "seed." Eventually other peers will possess the whole file, or at least every file fragment will be found on at least one client. Some peers may leave the network before possessing the whole file, while others may remain in the network well after completing retrieval of the file. The goal is to balance downloading clients with uploading clients.

Several techniques or policies may be used to ensure that it is possible to download the entire file. For example, the tracker may return a random list of peers to each new participant in the download. As another example, P2P clients may attempt to request the rarest file fragment first. As more peers request the rarest file fragment, another file fragment becomes the rarest, and so forth. This technique helps to equally distribute the demand for particular file fragments. Other techniques, such as "random first" and "endgame mode" may be used; however, they are not a focus of this disclosure and will not be discussed in detail.

Content distribution among peers increases in efficiency with the number of peers who are sharing that content on a network. A network of peers participating in distributing a particular file is referred to as a "swarm." Swarms are formed around the retrieval of a particular file and are comprised of peers retrieving (downloading) and sharing (uploading) file fragments simultaneously. The larger the swarm, the faster the per-peer retrieval of that file, and the more distributed the bandwidth cost becomes for each participant client device.

SUMMARY

The illustrative embodiments described herein recognize the disadvantages of the prior art and provide a mechanism for background file sharing in a segmented peer-to-peer file sharing network. Each file sharing participant may designate an amount of bandwidth and/or storage space for background file sharing. Peer-to-peer (P2P) file sharing clients then share file data and content in the background automatically. The client may participate in additional swarms, in the background, to generally increase the number of peers in file sharing networks, thus increasing the speed of downloading desired files for other users.

In accordance with one illustrative embodiment, when a file is moved from the background to the foreground in a P2P client, the client makes a local request for file pieces. The client sends a handshake message to itself to check for available pieces. The client then exchanges messages locally the same way it would with external peers.

As an alternative approach to local message passing, the client may keep a local record of file fragments in a data structure, such as a markup language document or other data repository. The client may then query the data structure for needed file fragments before submitting a request to the P2P network. With this embodiment, every time a new file segment is downloaded and validated in the background, or the foreground, the P2P client may update the data structure. Then, instead of sending a request to itself, the client may simply query the data structure for the specific segment it wishes to download.

In one illustrative embodiment, a method in a peer-to-peer file sharing client for moving a file from background file sharing to foreground file sharing and preventing duplicate downloads in a peer-to-peer file sharing network comprises receiving at least one file fragment of a file from a background swarm for background file sharing, responsive to a request to move the file from background file sharing to foreground file sharing, identifying the at least one file fragment stored locally, and requesting at least one remaining file fragment from the background swarm. The background swarm becomes a foreground swarm.

In one exemplary embodiment, identifying the at least one file fragment stored locally comprises initiating a local request for file fragments, sending a handshake message to self to check for available file fragments, and exchanging messages to self to request and respond for the at least one file fragment stored locally.

In another exemplary embodiment, the method further comprises responsive to receiving a given file fragment of the file from the background swarm, storing an identification of the given file fragment in a data structure. In a further exemplary embodiment, identifying the at least one file fragment stored locally comprises examining the data structure for file fragments identified as being stored locally. In a still further exemplary embodiment, the data structure is a markup language document.

In yet another exemplary embodiment, requesting at least one remaining file fragment from the background swarm comprises sending a request to a tracker for a peer list. In a further exemplary embodiment, requesting at least one remaining file fragment from the background swarm further comprises exchanging messages with peers to request, respond, and exchange data for the at least one remaining file fragment.

In another illustrative embodiment, a peer-to-peer file sharing client for moving a file from background file sharing to foreground file sharing and preventing duplicate downloads in a peer-to-peer file sharing network comprises a processor and a memory. The memory contains instructions which, when executed by the processor, cause the processor to receive at least one file fragment of a file from a background swarm for background file sharing, responsive to a request to move the file from background file sharing to foreground file sharing, identify the at least one file fragment stored locally, and request at least one remaining file fragment from the background swarm. The background swarm becomes a foreground swarm.

In one exemplary embodiment, identifying the at least one file fragment stored locally comprises initiating a local request for file fragments, sending a handshake message to self to check for available file fragments, and exchanging messages to self to request and respond for the at least one file fragment stored locally.

In another exemplary embodiment, the memory contains instructions which, when executed by the processor, further cause the processor to responsive to receiving a given file fragment of the file from the background swarm, store an identification of the given file fragment in a data structure. In a further exemplary embodiment, identifying the at least one file fragment stored locally comprises examining the data structure for file fragments identified as being stored locally.

In yet another exemplary embodiment, the data structure is a markup language document.

In another exemplary embodiment, requesting at least one remaining file fragment from the background swarm comprises sending a request to a tracker for a peer list. In a further exemplary embodiment, requesting at least one remaining file fragment from the background swarm further comprises exchanging messages with peers to request, respond, and exchange data for the at least one remaining file fragment.

In a further illustrative embodiment, a computer program product comprises a computer useable medium having a computer readable program. The computer readable program, when executed on a computing device, causes the computing device to receive at least one file fragment of a file from a background swarm for background file sharing, responsive to a request to move the file from background file sharing to foreground file sharing, identify the at least one file fragment stored locally, and request at least one remaining file fragment from the background swarm. The background swarm becomes a foreground swarm.

In one exemplary embodiment, identifying the at least one file fragment stored locally comprises initiating a local request for file fragments, sending a handshake message to self to check for available file fragments, and exchanging messages to self to request and respond for the at least one file fragment stored locally.

In another exemplary embodiment, the computer readable program, when executed on the computing device, further causes the computing device to responsive to receiving a given file fragment of the file from the background swarm, store an identification of the given file fragment in a data structure. In a still further exemplary embodiment, identifying the at least one file fragment stored locally comprises examining the data structure for file fragments identified as being stored locally.

In yet another exemplary embodiment, requesting at least one remaining file fragment from the background swarm comprises sending a request to a tracker for a peer list. In a further exemplary embodiment, requesting at least one remaining file fragment from the background swarm further comprises exchanging messages with peers to request, respond, and exchange data for the at least one remaining file fragment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 10 depicts an example data structure for recording file fragments in a peer-to-peer file sharing client in accordance with an illustrative embodiment, FIG. 11 is a flowchart illustrating operation of a peer-to-peer client recording file fragments in accordance with an illustrative embodiment; and FIG. 12 is a flowchart illustrating operation of a peer-to-peer client moving a background file download to the foreground using a file/repository in accordance with an illustrative embodiment.

DETAILED DESCRIPTION OF THE ILLUSTRATIVE EMBODIMENTS

Figure 1:
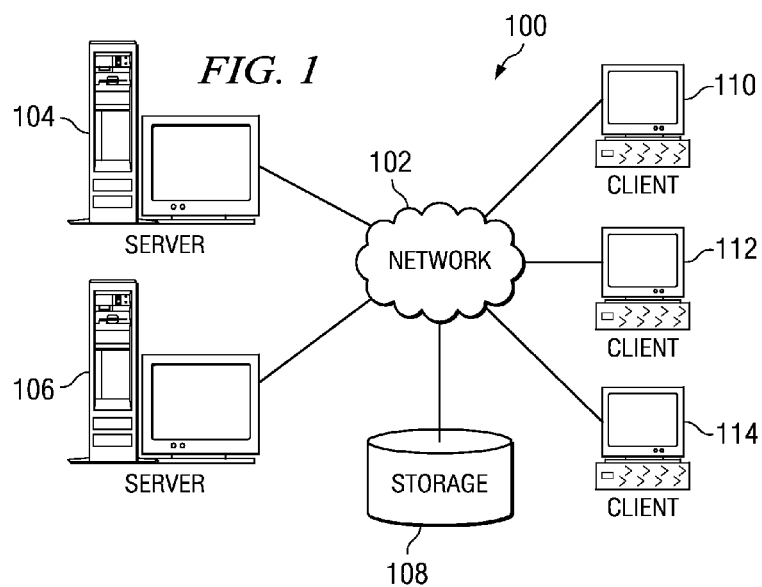
FIG. 1 depicts a pictorial representation of an exemplary distributed data processing system in which aspects of the illustrative embodiments may be implemented.
Figure 2:
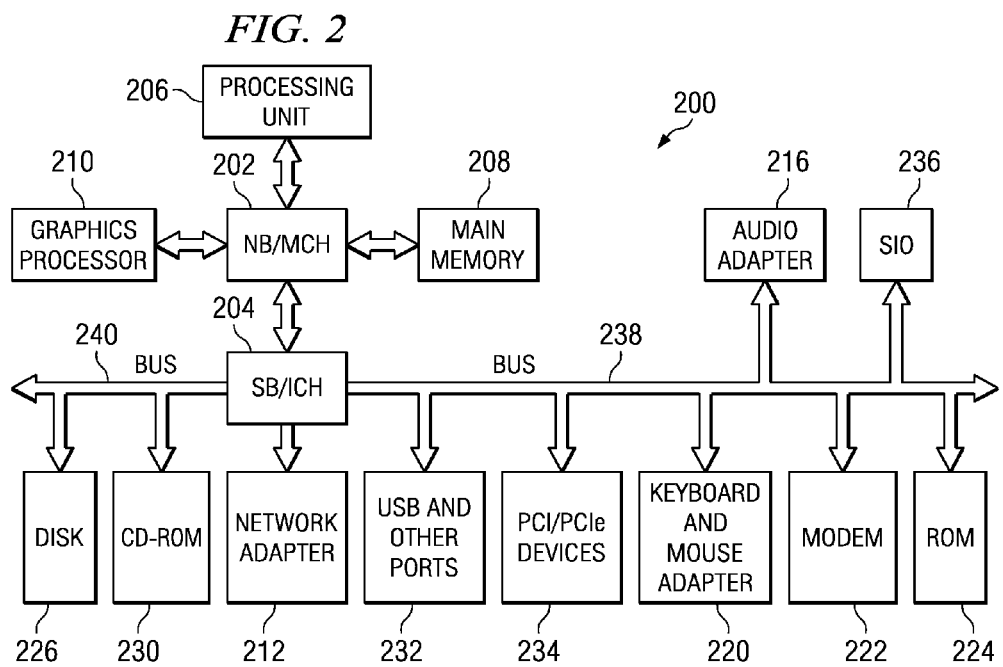
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In one illustrative embodiment, server 104 may provide access to a Web page or other content that contains a link to file information for a given file. Server 106 may be a tracker for the file. Clients 110-114 may have peer-to-peer (P2P) file sharing clients that participate in downloading the given file.

More particularly, clients 110 and 112 may already be members of a swarm, each downloading file fragments from and uploading file fragments to peers in the swarm. A user at client 114 may click on the link, which results in the P2P client software downloading file information including, for example, file name, file length, hashing information, and an address of the tracker at server 106. The address of the tracker may be a uniform resource locator (URL), for instance.

The P2P client software at client 114 may then contact the tracker at server 106, which, in turn, responds with addresses of clients 110, 112. Client 114 then establishes communication with clients 110, 112, and begins downloading file fragments. As client 114 downloads file fragments, it reports the file fragments it has available for upload to the other peers in the swarm.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

The efficiency of content distribution increases relative to the number of peers who are sharing that content. The peers are segmented in the file sharing network. Swarms are formed around the retrieval of a particular file. If the number of peers sharing a file is too low, then the number of peers having a given file fragment may be low as well. As a result, a P2P client that has a rare file fragment available for upload may receive a high number of requests for that file fragment, and the bandwidth is not ideally distributed among the peers. Increasing the number of peers in a swarm helps to more evenly distribute the bandwidth costs.

In accordance with the illustrative embodiments, a peer-to-peer file sharing system is provided in which participant clients make an amount of storage space and bandwidth available for background file sharing. That is, a P2P client may participate in a swarm even if the user of that client did not explicitly request that file. In this manner, swarms are grown without the need to advertise a file, through a Web site, for example. Peers may participate in a swarm by sharing file fragments in the background without attempting to possess the entire file.

Normally, in the prior art, a swarm is formed around a particular file out of want, or "pull," so the swarm is defined by all users wanting that file. However, in accordance with the illustrative embodiments, a swarm may also be formed based on storage space and bandwidth available for sharing information, either file fragments or some other information about the file. The net effect is a larger swarm, a higher density of participation, and more evenly distributed bandwidth costs.

With reference now to FIG. 2, a block diagram of an exemplary data processing system is shown in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
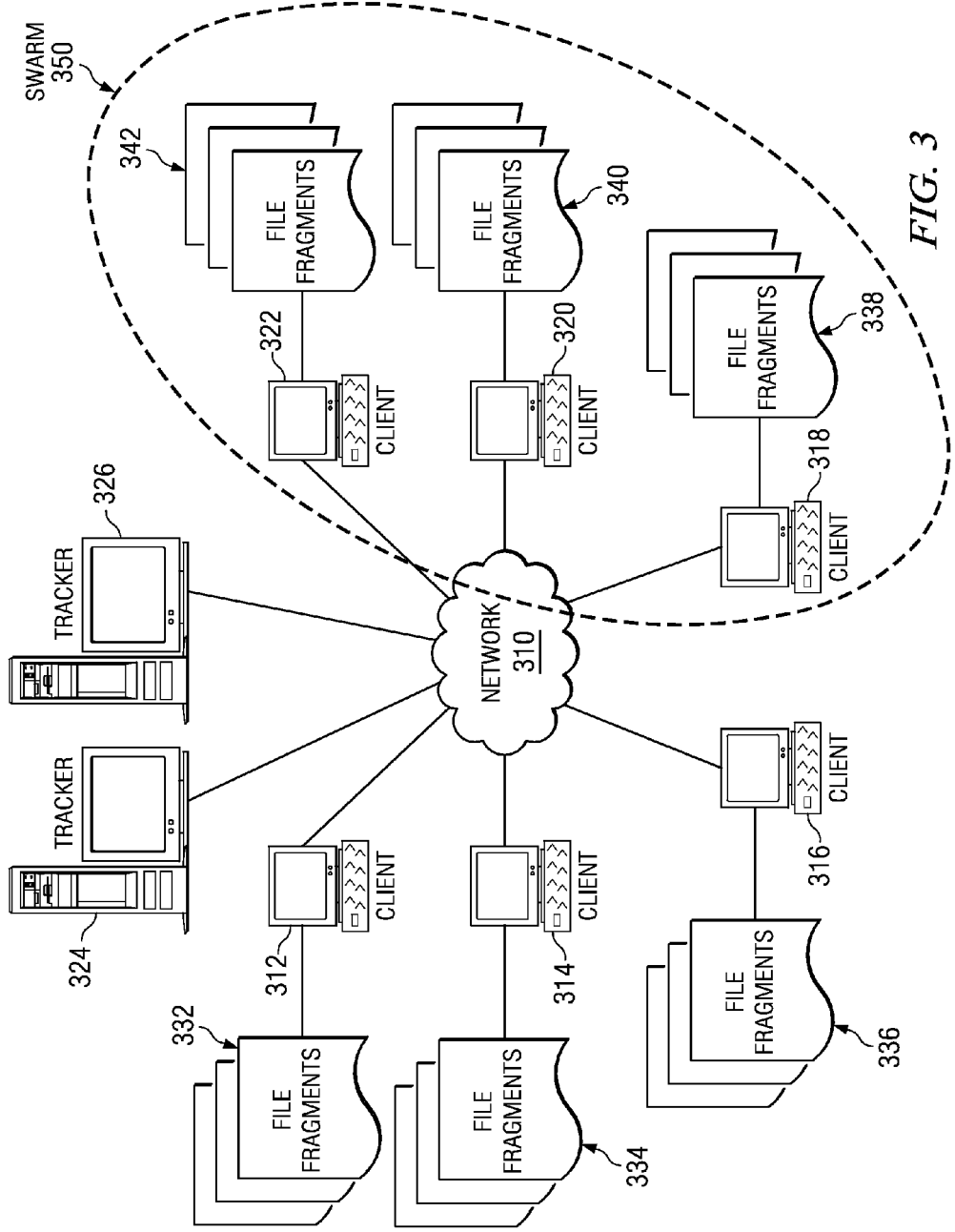
FIG. 3 depicts a pictorial representation of a segmented file sharing network in accordance with an illustrative embodiment.

FIG. 3 depicts a pictorial representation of a segmented file sharing network in accordance with an illustrative embodiment. Clients 312-322 are connected to network 310. Trackers 324, 326 are responsible for helping clients 312-322 find each other to form segmented networks, or "swarms," of peers for downloading/uploading particular files. Clients 312-322 possess file fragments 332-342, respectively.

In the depicted example, clients 318, 320, 322 are part of swarm 350. Clients 312, 314, 316 may be participants of other swarms. In accordance with an illustrative embodiment, clients 312, 314, 316 may provide bandwidth and storage space for background file sharing. That is, client 316, for instance, may take part in swarm 350 without a user at client 316 expressly requesting the file being distributed in swarm 350.

Figure 4:
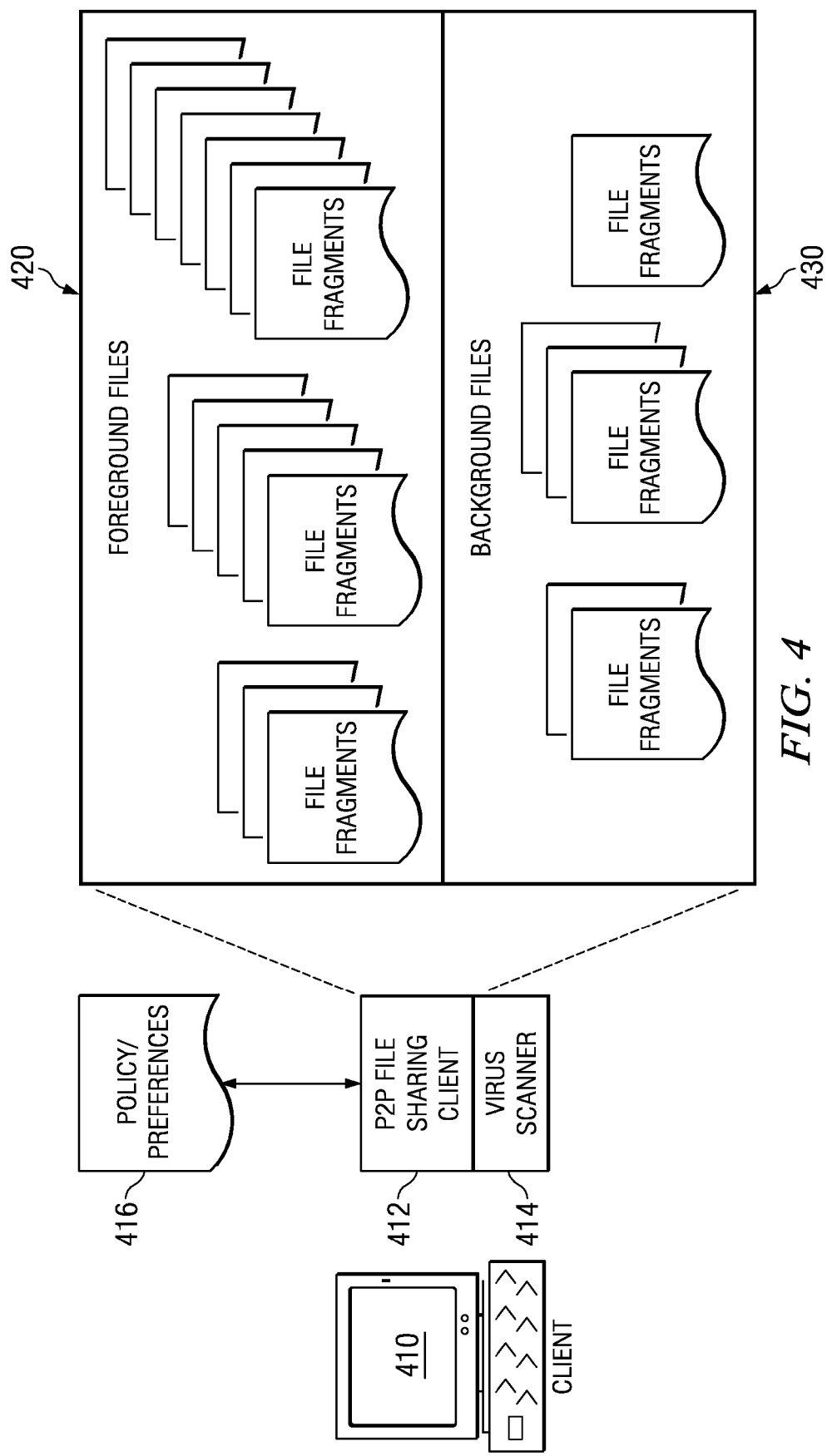
FIG. 4 is a block diagram illustrating a configuration of a peer-to-peer client with background file sharing in accordance with an illustrative embodiment.

FIG. 4 is a block diagram illustrating a configuration of a peer-to-peer client with background file sharing in accordance with an illustrative embodiment. Client 410 includes peer-to-peer (P2P) file sharing client 412 and virus scanner 414. When a user of client 410 selects a file for download, P2P client 412 contacts the tracker, receives a list of peers, and requests file fragments.

Files that are expressly requested by a user, or otherwise being of express interest to the user, are downloaded in the foreground. For example, a user may subscribe to a particular group, and, thus, may automatically retrieve files being shared by that group. As another example, the client may be programmed to retrieve any new episode of a particular video broadcast or any new music from a particular artist. File fragments for these files are stored in foreground files 420.

Note that content being distributed in the peer-to-peer network, as described herein, is managed content. P2P client 412 may include functionality for preventing illegal distribution or receipt of copyrighted content. For example, P2P client 412 may validate a digital signature of a file with a trusted third party. However, preventing illegal distribution is not a focus of this disclosure, and such functionality will not be discussed in detail.

In accordance with the illustrative embodiment, P2P client 412 also receives and shares file fragments in the background to grow swarms in which the user of client 410 is not expressly interested. In other words, P2P file sharing client 412 may automatically share file fragments without the user manually requesting the download. The user may not intend to view the content and does not need to monitor the background file sharing. P2P client 412 stores file fragments that are downloaded in the background in background files 430.

The file fragments in foreground files 420 are downloaded with the express purpose of possessing the entire file, although a user may cancel a download without ultimately possessing the entire file. On the other hand, the file fragments in background files 430 will likely never result in the entire file being downloaded. Rather, file fragments in background files 430 may be only the most rare file fragments, may expire after a specified period of time, or may remain small in number due to storage or bandwidth limits specified by the user.

For security, background files 430 may be a portion of storage that is partitioned to a defined space on a storage device within client 410, where it cannot be executed. Virus scanner 414 may be applied to background files 430, or perhaps all content within foreground files 420 and background files 430.

In one exemplary embodiment, P2P file sharing client 412 may select peers based on protocol/client. When a downloader participates in a swarm, it receives information in the background, such that it can participate as a peer in other swarms. This may include all users of a particular P2P protocol or client. For example, if P2P file sharing client 412 is a BITTORRENT client, then P2P client 412 may participate with any other swarms it discovers, in the background, as long as the peers in the other swarms are BITTORRENT clients communicating using the BITTORRENT protocol.

In another embodiment, P2P file sharing client 412 may also select peers for background file sharing based on user-selected communities. Users may opt-in to support particular communities, rather than sharing files at random. For example, if the file sharing system encompasses a community of artists, the members of that community may use P2P file sharing to share high-resolution images and media of art with each other. A particular peer subscribed to the community may have pieces of all different media on the client device that are of no particular interest to the user, but the P2P client hosts those file fragments to help provide a high-quality distribution channel to everyone in the community.

P2P client 412 may have user-defined limits on the amount of storage and/or bandwidth available for background file sharing. Oldest file fragments, least recently requested file fragments, or least frequently requested file fragments may be overwritten such that the most relevant content is always available within a limited storage space.

P2P client 412 may also allow the user to select trusted peers. The P2P file sharing system may then build trust among peers, for example, by sharing a list of trusted peers that can be modified by each client according to their relationships. Users may also build lists of peers that are known to be malicious (blacklist).

Information about the policy and preferences under which P2P file sharing client 412 operates may be stored in policy/preferences data structure 416. Thus, policy/preferences data structure 416 may store security policies or preferences, peer selection policies or preferences, storage/bandwidth limits, a list of trusted peers, or a list of blacklisted peers, as described above.

Figure 5:
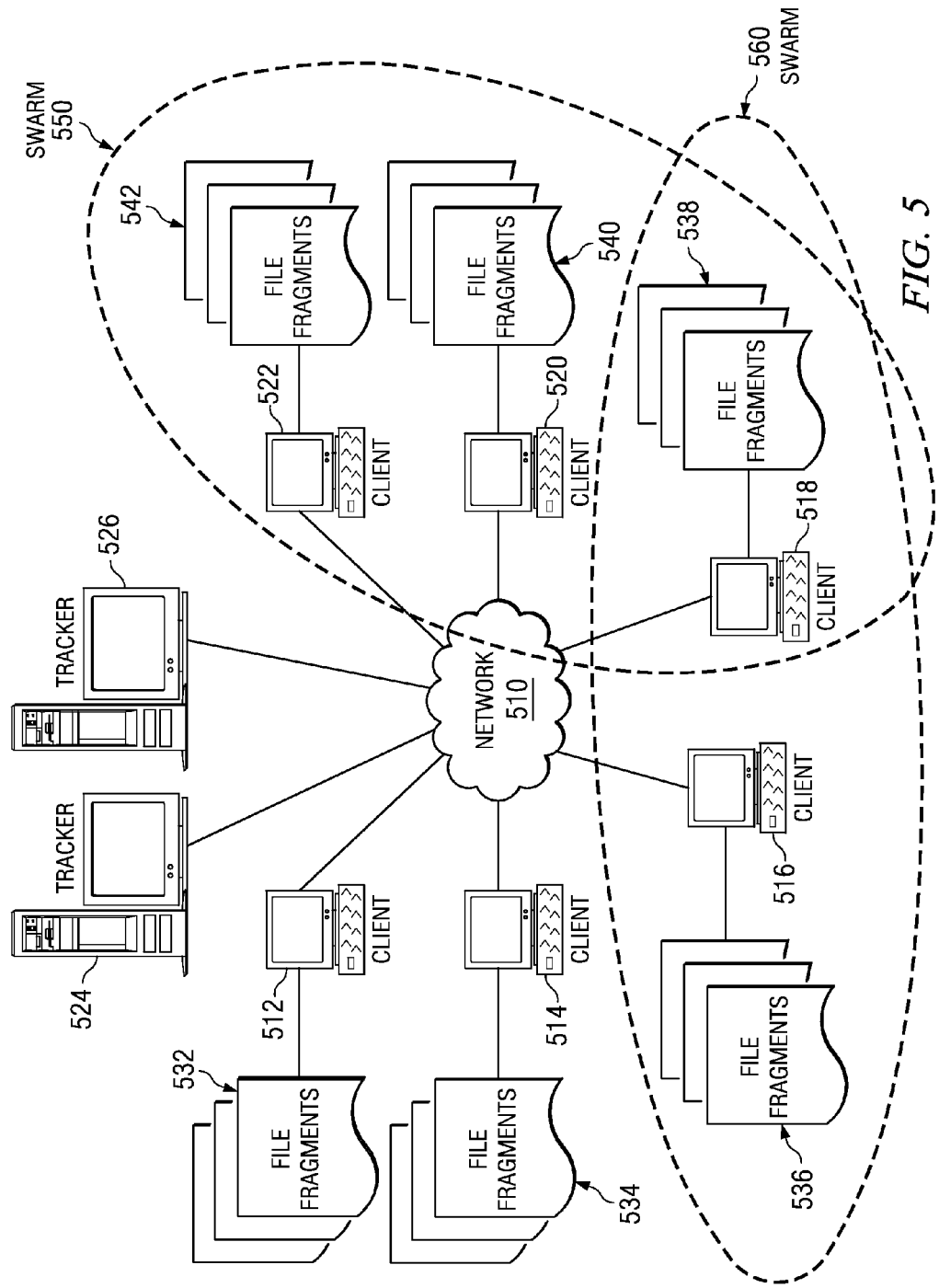
FIG. 5 depicts a pictorial representation of a segmented file sharing network with background file sharing in accordance with an illustrative embodiment.

FIG. 5 depicts a pictorial representation of a segmented file sharing network with background file sharing in accordance with an illustrative embodiment. Clients 512-522 are connected to network 510. Trackers 524, 526 are responsible for helping clients 512-522 find each other to form segmented networks, or "swarms," of peers for downloading/uploading particular files. Clients 512-522 possess file fragments 532-542, respectively.

In the depicted example, clients 518, 520, 522 are part of swarm 550. In addition, clients 516, 518 are part of swarm 560. Clients 512-522 may be participants of other swarms. In accordance with an illustrative embodiment, client 516 may provide bandwidth and storage space for background file sharing. That is, client 516, for instance, may take part in swarm 550 without a user at client 516 expressly requesting the file being distributed in swarm 550.

What files, or file fragments, are shared in the background can vary based on the community model utilizing the background file sharing technique of the illustrative embodiments. In one exemplary embodiment, a central server and/or provider (not shown) may record and control where files and file fragments exist on the network. This central provider may send commands to peers 512-522 indicating which files to request from other peers in the network in order to increase swarm size, especially for more popular files.

In another exemplary embodiment, the distribution method allows peers 512-522 to trade file segments based on the rarity of the segments in each swarm. In this case, the actual information being distributed among peers is the file itself. When a peer joins a swarm, it begins retrieving the file and sharing it with other peers at the same time. When a peer receives a piece of the file, it exchanges a piece of another file in the background based on the rarity of the piece it received. For example, in exchange for receiving a file fragment that is N rare from client 520, client 516 may trade 5 file fragments that are each N/5 rare. In an alternative embodiment, P2P clients may share file fragments without considering the rarity of the file fragments. For example, P2P clients may share file fragments at random or based on relative/comparable size.

In a community where the swarms (and files) are contained and controlled, file fragments given to a peer in the background are likely to be relevant and useful to another peer. For example, in a P2P file sharing system within a work environment, there is a high probability that files or file fragments shared in one swarm will be relevant to another swarm. In any event, how often a trade for file fragments is performed between two peers is trivial as long as another swarm is able to gain a peer with which the swarm may share at least one piece.

Once a background peer receives a small number of file fragments, that peer will likely only be uploading in the background; it will not be receiving in that swarm until it can assist the swarm with other rare file fragments. For example, client 516 may receive and host a small number of rare file fragments for swarm 550. Client 516 will not receive any more file fragments for swarm 550 until those file fragments expire, are no longer rare, or peers in swarm 550 drop out of the swarm leaving even rarer file fragments. Alternatively, client 516 may receive and host a small number of file fragments until they expire, and then cease background file sharing in swarm 550 altogether, for example.

In fact, a peer sharing in the background may also share parts of the swarm in which it is participating in the foreground, automatically increasing the size of its own swarm. For instance, client 516 may host file fragments for background file sharing in swarm 550; however, clients 518-522 may also host file fragments for swarm 560 to grow the size of that swarm. If both swarms are the same size, background file sharing may nearly double the size of both swarms.

Background file fragments may expire after a given amount of time or contribution percentage. The background may be fully configurable by the peer to control how much space can be used for background sharing, how much bandwidth can be used for background sharing, how much of a file can be shared in the background, a minimum rarity for file fragments to be hosted in the background, number of background swarms in which to participate, etc.

Presumably, the P2P file sharing protocol or client algorithm may dictate that the rarest pieces of a swarm are to be sent to the background peers to make them less rare. The first link between two swarms may be made by at least one peer that is "intentionally" interested in both swarms. That peer, the user of which requests both files, may then propagate background sharing information (file information) to the other peers in both swarms.

Rather than trading actual content, peers may trade file names or file fragment identifiers. Upon receiving a new file name or identifier, a peer may request that file from the network, either in the background or the foreground. For example, once client 516 begins background file sharing in swarm 550, client 516 may propagate file information for files it possesses to all or a portion of the peers in swarm 550. Those clients now have the file information for a file without the user having to find that file advertised on a Web site, for example.

Each peer must know which files, or file fragments, to download in the background. One way to distribute this information is to pass a list between peers in the network that is populated with the names of the files that currently reside on each user's local system. Once a peer receives the list from another peer, it may select files or fragments from the list to request from the list sender or from all connected peers in that swarm. The file list could piggyback onto a file fragment that is transferred as a result of a manual client request.

Alternatively, a P2P client may pass a list of files to download based on known rare segments or popular files within the network. Rather than passing a list of files on the peer systems, the list may contain file fragments that were rarest at the time of a previous download. Alternatively, the list may contain identifiers of files recently requested by peers with counters that increase when more than one peer who has held the list has recently requested the same content. These lists may be based on manual user requests or on background requests. Each client may manipulate the list and pass it on. In an alternative embodiment, the list may be sent by a tracker to a peer.

In another exemplary embodiment, the P2P client may share files based on similar files shared within the swarm. Similar to Web sites that provide "users who purchased X also purchased Y" information, the P2P client may share files in the background according to correlated features, such as "artist" for music or a download timestamp within a certain range. When a user manually requests a file, background sharing may be initiated for files that are in some way correlated to that file. Those file fragments are likely to also be requested within that given swarm.

In yet another exemplary embodiment, a P2P client may share files using file lists obtained from a peer file-list-swap or a central provider (not shown). Peers may determine which files to request for background download based on pattern matching between a user attribute or timestamp and a particular data sequence in the file name. Matching strings could include particular bit sequences contained in either the original strings or hashes/checksums of the original strings.

Figure 6:
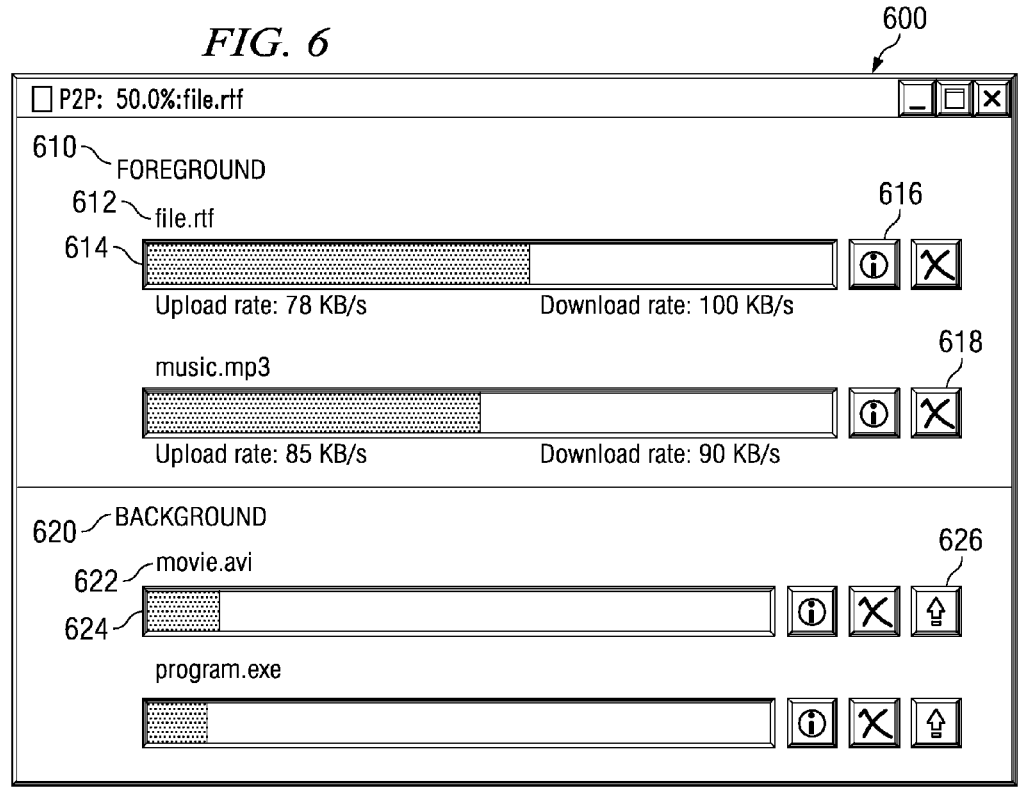
FIG. 6 depicts an example screen of display for a peer-to-peer client with background file sharing in accordance with an illustrative embodiment.

FIG. 6 depicts an example screen of display for a peer-to-peer client with background file sharing in accordance with an illustrative embodiment. Peer-to-peer (P2P) client window 600 includes a foreground download portion 610 and a background download portion 620.

Foreground portion 610 presents files that are being downloaded in the foreground, e.g. files that were expressly requested by a user of the P2P client. For each file, foreground download portion 610 presents file name 612 and progress bar 614. Also for each file being downloaded in the foreground, portion 610 presents an information control 616 and a cancel control 618. Responsive to the user selecting information control 616, the P2P file sharing client may present information about the file, such as the file name, file size, and so forth. Responsive to the user selecting cancel control 618, the P2P file sharing client may cease downloading of the file; however, the client may continue to upload file fragments it possesses to the peers in the swarm.

Background portion 620 presents files that are being downloaded in the background. For each file, background portion 620 presents a file name 622 and a progress bar 624. In one embodiment, progress bar 624 may present the progress with respect to the file size; however, background downloads are very unlikely to result in the entire file being downloaded. In fact, the purpose of background file sharing is to host a small number of rare file fragments for upload without a significant amount of download from the swarm. Therefore, progress bar 624 may represent other information, such as the percentage of background storage space used for the file, the percentage of background bandwidth used for uploading, contribution percentage, progress toward expiration, etc.

In addition to information and cancel controls, background portion 620 may also present a foreground control 626. The user of the P2P file sharing client may view the file information and may wish to possess the entire file. The user may then select foreground control 626, responsive to which the P2P client may move the file from background portion 620 to foreground download portion 610. The P2P client may then move the file fragments it possesses to foreground storage and begin requesting file fragments until the client possesses the entire file.

Figure 7:
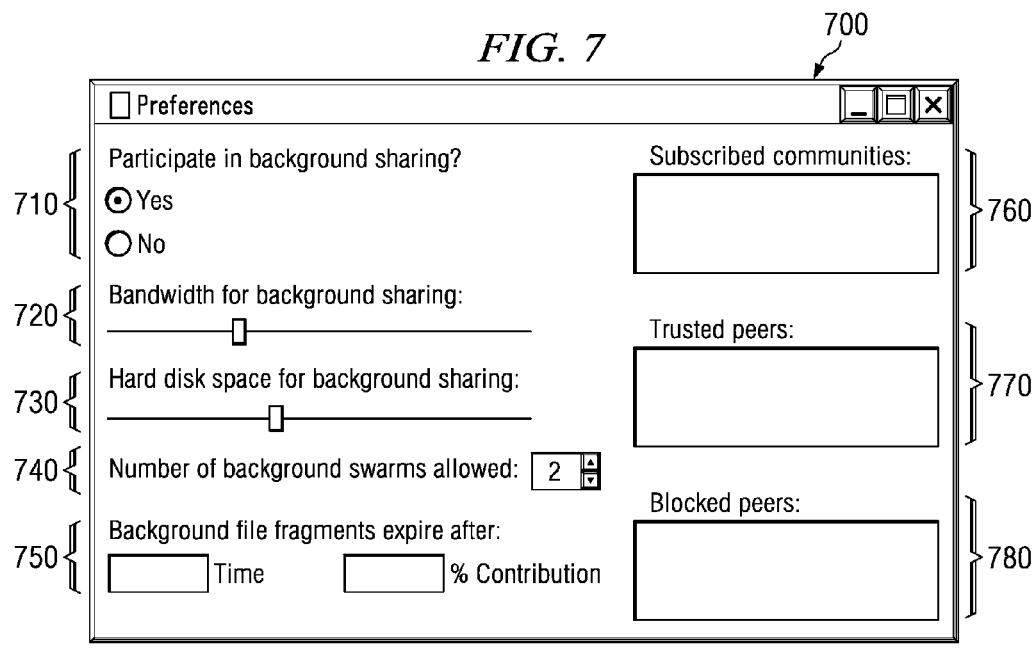
FIG. 7 depicts an example screen of display for a preferences user interface in accordance with an illustrative embodiment.

FIG. 7 depicts an example screen of display for a preferences user interface in accordance with an illustrative embodiment. Preferences user interface dialog 700 presents controls that allow a user to enter policy and preferences information to control the behavior of a peer-to-peer (P2P) file sharing client.

In the depicted example, control portion 710 presents a radio button control with which the user may opt-in or opt-out of background file sharing. If the user selects the "No" radio button in control portion 710, then the P2P file sharing client will not participate in background file sharing. In this instance, the "Yes" radio button is selected.

Control portion 720 presents a slider control with which the user may specify an amount of bandwidth to be used for background file sharing. Although a slider control is shown, other user interface controls may be used, such as text fields, dial controls, and the like. Alternatively, the amount of bandwidth to be used for background file sharing may be determined dynamically, based on an amount of bandwidth used for foreground file sharing, bandwidth used for other applications, time of day, whether the client device is idle, and so forth.

Control portion 730 presents a slider control with which the user may specify an amount of disk space to be used for background file sharing. Although a slider control is shown, other user interface controls may be used, such as text fields and the like. Alternatively, the amount of disk space to be used for background file sharing may be determined dynamically, perhaps in conjunction with the specified amount, based on the amount of available disk space, the amount of disk space used for foreground file sharing, etc.

Control portion 740 presents an input control with which the user may specify a number of background swarms allowed. Alternatively, the number of background swarms may be determined dynamically, perhaps in conjunction with the specified number, based on the number of foreground swarms, the amount of processing resources being used for other applications, and the like.

Control portion 750 presents controls with which the user may specify expiration parameters for background file fragments. The user may specify expiration parameters in units of time or according to percentage of contribution. Alternatively, the P2P client may expire background file fragments using other parameters, such as most commonly available in the swarm, least recently requested, least frequently requested, and so forth.

Control portion 760 presents an input control with which the user may specify communities to which the user subscribes. Thus, the user may subscribe to a community of musicians or amateur film makers, and whenever a file is being distributed in a specified community, the P2P client may participate in background file sharing to help grow the swarms for those communities. The user may enter the names of the communities directly using text, or may use other selection controls that are generally known in the art.

Control portion 770 presents an input control with which the user may specify a list of trusted peers. The user may enter the names, usernames, addresses, or the like of trusted users, such as friends or co-workers, for example. Thus, when one of the trusted peers begins sharing files in a swarm, the P2P client may participate in background file sharing to help grow the swarms for the trusted peers. The user may enter the names, usernames, addresses, etc. of trusted peers directly using text, or may use other generally known selection controls.

Control portion 780 presents an input control with which the user may specify a list of blocked peers. The user may enter the names, usernames, addresses, or the like of users that are known to provide malicious or illegal content, for example. Thus, when the P2P client participates in background, or foreground, file sharing to grow a swarm, the client may refuse to receive file fragments from or provide file fragments to peers in the blocked peers list. The user may enter the names, usernames, addresses, etc. of blocked peers directly using text, or may use other generally known selection controls.

Figure 8A:
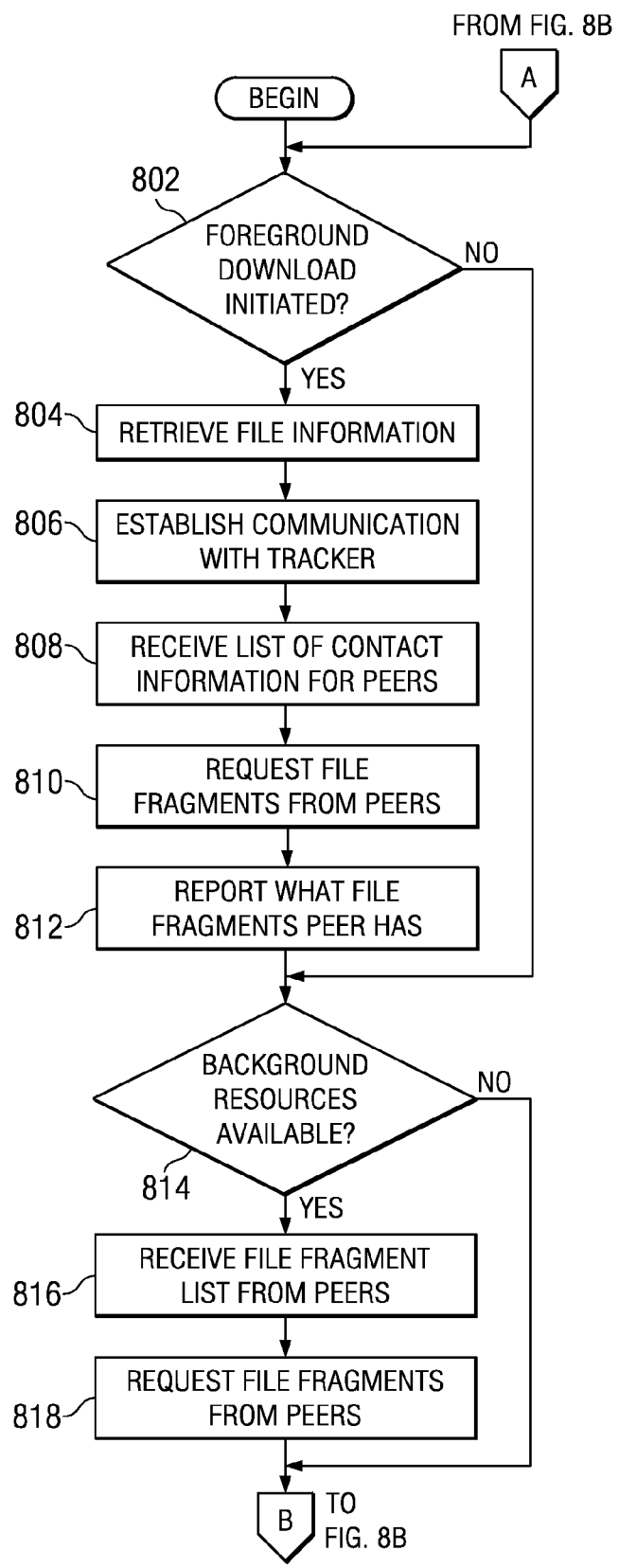
FIGS. 8A and 8B present a flowchart illustrating operation of a peer-to-peer file sharing client with background file sharing in accordance with an illustrative embodiment.
Figure 8B:
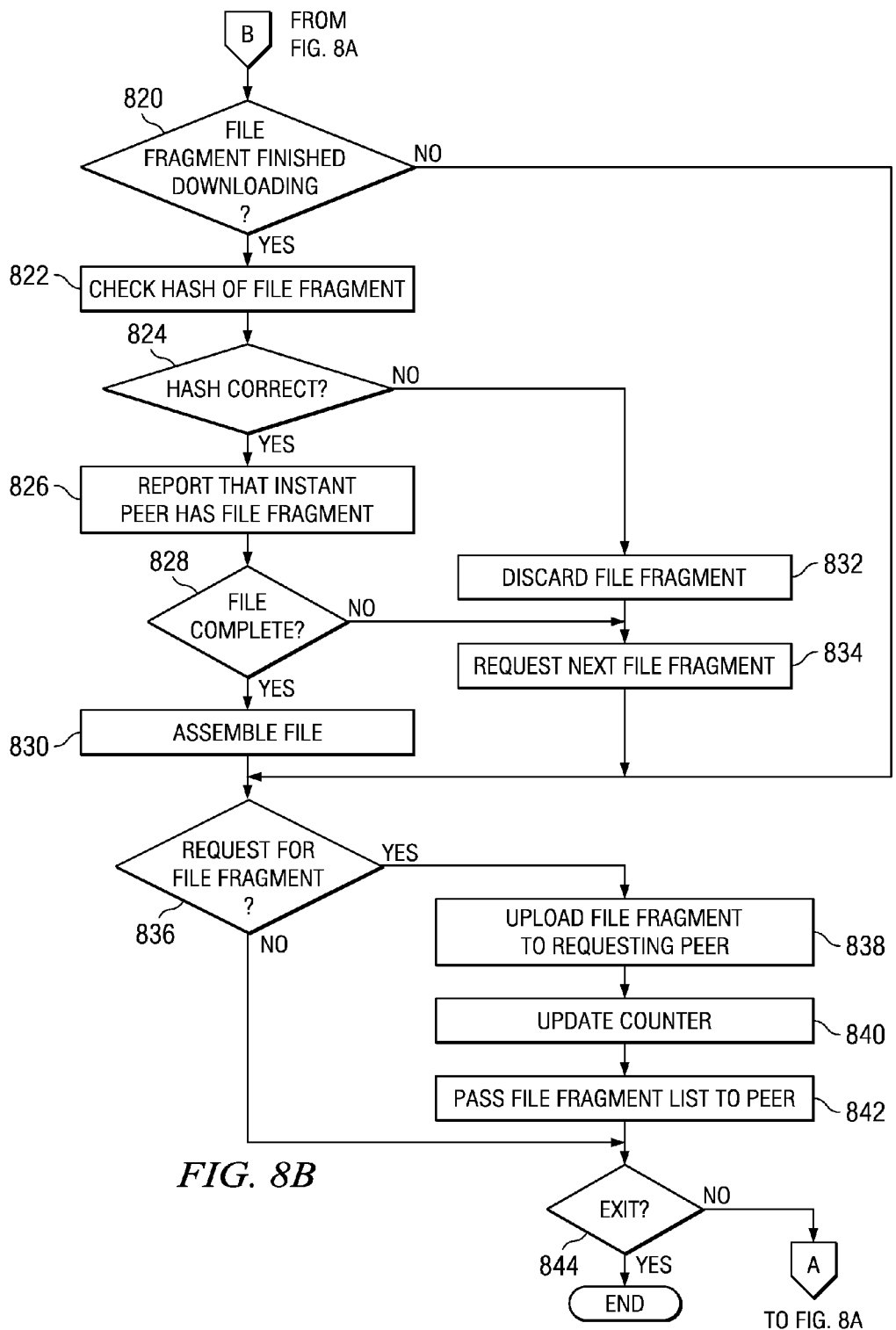

FIGS. 8A and 8B present a flowchart illustrating operation of a peer-to-peer file sharing client with background file sharing in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

With reference to FIG. 8A, operation begins and the peer-to-peer (P2P) client determines whether a foreground download is initiated by the user (block 802). The user may initiate a foreground download, for example, by selecting a link to file information, such as a torrent. If the P2P client determines that a foreground download is initiated, the client retrieves the file information (block 804), establishes communication with the tracker (block 806), and receives a list of contact information for peers (block 808). Then, the P2P client requests file fragments from one or more of the peers (block 810). The P2P client reports to the peers in the swarm what file fragments it possesses (block 812).

Thereafter, or if the P2P client determines that a foreground download is not initiated in block 802, the P2P client determines whether storage space and bandwidth are available for background file sharing (block 814). If background storage and bandwidth resources are available, the P2P client receives file fragment list from peers (block 816). The P2P client may request a file fragment list from peers; however, the file fragment list may be piggybacked on file fragments in a foreground download. The file fragment list may be based on file name trading, files that each peer possesses, known rare file fragments or popular files, similar files within a swarm, or pattern matching, as described above. Alternatively, as described in further detail above, the P2P client may receive a list of file fragments based on rarity of file fragments, randomly selected file fragments, or file fragments with relative or comparable size to those being shared by the P2P client. In another alternative embodiment, the P2P client may receive the file fragment list from a central server or provider, as disclosed above. Given a list of file fragments that may be shared in the background, the P2P client requests file fragments from peers (block 818). The number of file fragments the P2P client may request to share in the background may be based on an amount of background storage space or bandwidth available, rarity of the file fragments, and so forth.

Thereafter, or if the P2P client determines that background storage or bandwidth resources are not available in block 814, the P2P client determines whether a file fragment is finished downloading (block 820). This may be a foreground file fragment or a background file fragment, because the P2P client will treat the downloading of individual file fragments the same. If a file fragment is finished downloading, the P2P client performs a hash on the file fragment (block 822) and determines whether the resulting hash value is correct (block 824). The P2P client determines whether the hash value is correct based on hash information received in block 804 or in the file fragment list received in block 816. If the hash value is correct, the P2P client reports to the peers in the swarm that it has the file fragment (block 826).

Thereafter, the P2P client determines whether download of the entire file is complete (block 828). It is likely that the P2P client will completely download a file if the file is part of foreground file sharing; however, it may be possible to download an entire file in background file sharing, especially if the P2P client is not currently participating in any foreground file sharing, for instance. If the file download is complete, the P2P client assembles the file (block 830).

Returning to block 824, if the hash is not correct for the file fragment, the P2P client discards the file fragment (block 832) and requests a next file fragment (block 834). In addition, although not illustrated here, the P2P client may automatically add the peer from which the file fragment was received to a blocked peer list after a specified number of invalid file fragments. With reference to block 828, if the file download is not complete, the P2P client requests a next file fragment (block 834).

After assembling the file in block 830 or requesting a next file fragment in block 834, or if the client determines that a file fragment is not finished downloading in block 820, the P2P client determines whether a request for a file fragment is received (block 836). This request may be for a file fragment being shared in the foreground or the background, because the P2P client may treat the uploading of file fragments the same regardless of whether the file fragment is being shared in the foreground or background. Alternatively, the P2P client may give precedence to requests for file fragments being shared in the foreground or may apply other techniques, such as satisfying requests in order of rarity, for example. If a request is received for a file fragment, the P2P file sharing client uploads the requested file fragment to the requesting peer (block 838). Then, the P2P client may update a counter (block 840) to keep track of the rarity of file fragments or the popularity of files. The P2P client may also pass a file fragment list to the requesting peer (block 842). This file fragment list may include a list of the file fragments that the client possesses, a list of the rarest file fragments, a list of popular files, a correlation of files, or other file names or identifiers, as described in further detail above.

Thereafter, or if the P2P client determines that a request for a file fragment is not received in block 836, the P2P client determines whether an exit condition exists (block 844). An exit condition may exist, for example, if the user closes the P2P file sharing client, if the client device shuts down or loses connection to the P2P file sharing network, etc. If an exit condition exists, operation ends. Otherwise, if an exit condition does not exist in block 844, operation returns to block 802 to determine whether a foreground download is initiated.

When a user requests a particular file that is being shared in the background for download from the P2P network, the client may already store file fragments locally. The client may then query the local system for needed file fragments before requesting file fragments from peers in the P2P network.

In normal foreground file sharing, the client would send a request to a tracker using information from a metainfo file, such as a torrent. The tracker responds with a peer list to help the client participate in the file sharing. The client then exchanges file fragments by sending handshake messages to potential peers with the information key of the metainfo file. Peers that have the file respond. Peers exchange messages with requests, responses, and data interchange.

However, in accordance with one illustrative embodiment, when a file is moved from the background to the foreground in a P2P client, the client makes a local request for file pieces. The client sends a handshake message to itself to check for available pieces. The client then exchanges messages locally the same way it would with external peers. For example, a request may be as follows:
    <len=0013><id=6><index><begin><length>

The request message is fixed length and is used to request a block. The payload contains the following information:
    index: integer specifying the zero-based piece index;
    begin: integer specifying the zero-based byte offset within the piece; and
    length: integer specifying the requested length.
    A have message may be as follows:
    <len=0005><id=4><piece index>

The have message is fixed length. The payload is the zero-based index of a piece that has just been successfully downloaded and verified via a hash.

When the "have" request is received, rather than responding with "interested" or "not interested," the P2P client may add the locally resident piece to the pre-assembled file by creating a pointer to the piece on disk or moving the piece to a safe, or more permanent, section of disk if there is a particular segment of disk conserved for background sharing.

Figure 9:
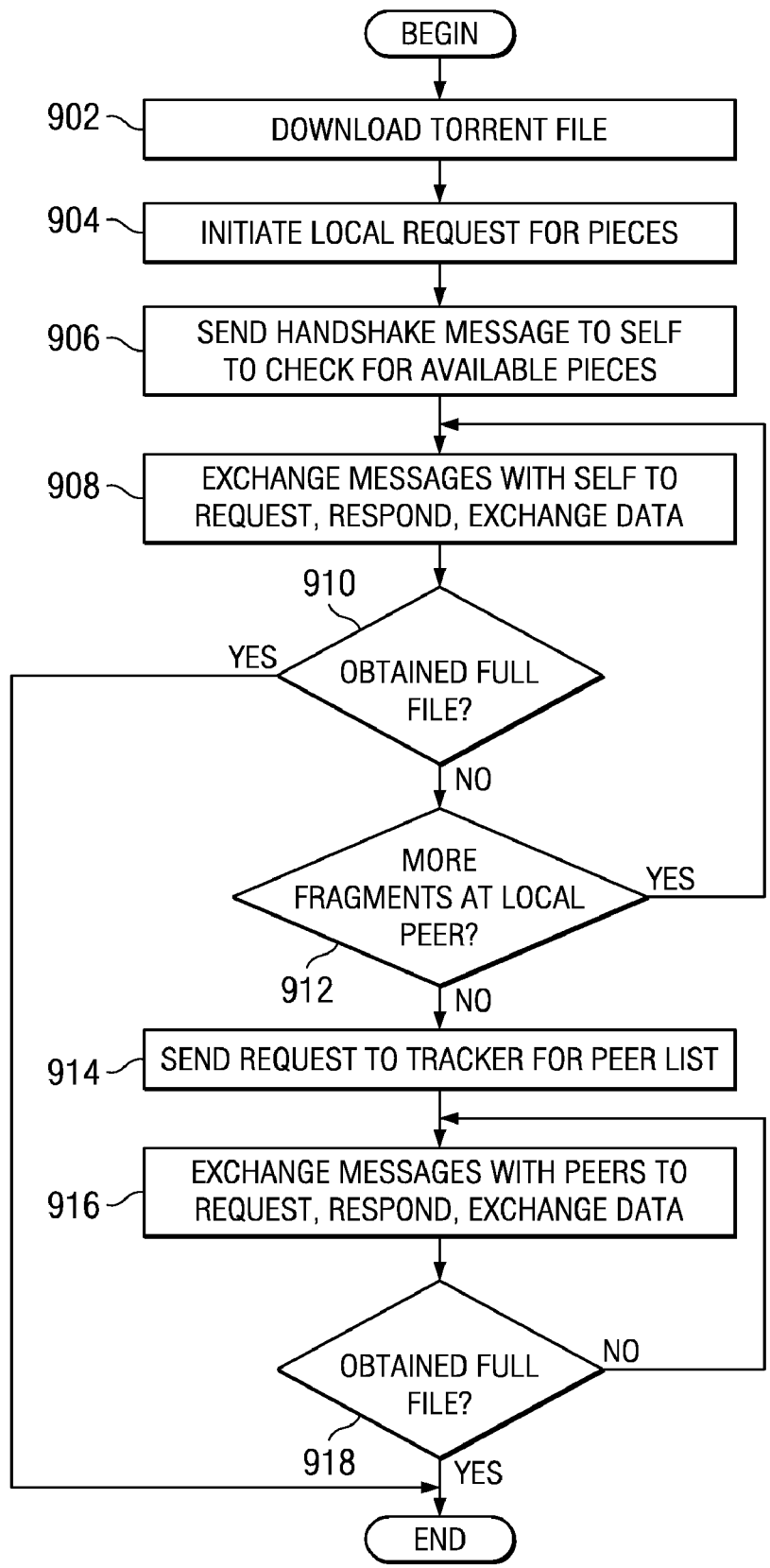
FIG. 9 is a flowchart illustrating operation of a peer-to-peer client moving file fragments from background file sharing to foreground file sharing in accordance with an illustrative embodiment.

FIG. 9 is a flowchart illustrating operation of a peer-to-peer client moving file fragments from background file sharing to foreground file sharing in accordance with an illustrative embodiment. Operation begins when a user selects a background file be moved to foreground file sharing. The P2P client downloads the torrent file (block 902) and initiates a local request for pieces (block 904). The P2P client sends a handshake message to itself to check for available pieces (block 906). The P2P client then exchanges messages with itself to request, respond, and exchange data (block 908).

Thereafter, the P2P client determines whether the full file is obtained (block 910). If the full file is obtained, operation ends. If the full file is not obtained in block 910, the P2P client determines whether more fragments exist at the local peer (block 912). If more fragments exist locally, operation returns to block 908 where the P2P client exchanges messages with itself to request, respond, and exchange data.

If no more fragments exist locally in block 912, the P2P client sends a request to the tracker for a peer list (block 914). The P2P client then exchanges messages with peers to request, respond, and exchange data (block 916). Then, the P2P client determines whether the full file is obtained (block 918). If the full file is obtained, operation ends. Otherwise, if the P2P client determines that the full file has not been obtained in block 918, operation returns to block 916 where the P2P client exchanges messages with peers to request, respond, and exchange data.

As an alternative approach to local message passing, the client may keep a local record of file fragments in a data structure, such as a markup language document or other data repository. The client may then query the data structure for needed file fragments before submitting a request to the P2P network. With this embodiment, every time a new file segment is downloaded and validated in the background, or the foreground, the P2P client may update the data structure. Then, instead of sending a request to itself, the client may simply query the data structure for the specific segment it wishes to download.

FIG. 10 depicts an example data structure for recording file fragments in a peer-to-peer file sharing client in accordance with an illustrative embodiment. In the example depicted in FIG. 10, the data structure is a markup language document, such as an extensible markup language (XML) document. If the P2P client initiates download of John Smith's cell phone contacts in the foreground, the P2P client may check the local file system using the XML document and determine that the local system already has pieces of the file in the background repository. The client may determine that the Contacts A-C, Contacts F-T, and Contacts U-Z file fragments have been downloaded, while Contacts D-E file fragment is missing. The client may then request only the missing file fragment from external peers in the P2P network.

FIG. 11 is a flowchart illustrating operation of a peer-to-peer client recording file fragments in accordance with an illustrative embodiment. Operation begins when the P2P client begins downloading a file in the background, although recording of file fragments may be performed for foreground file sharing as well. The P2P client receives a file fragment for background file sharing (block 1102). The P2P client creates a file/repository for the background file (block 1104) and adds the received fragment information to the file/repository (block 1106). As stated above, the file/repository may be a markup language document, such as the XML document shown in FIG. 10, or some other data structure, such as a database or the like.

Then, the P2P client determines whether the user has requested to move the download of the file to the foreground (block 1108). If the user requests to move the file to the foreground, operation ends, and the P2P client begins foreground file sharing, as described in further detail below with reference to FIG. 12. If the user does not request to move the file to the foreground in block 1108, the P2P client determines whether more fragments for the file are received (block 1110). If no more fragments are received, operation ends. However, if more fragments are received, operation returns to block 1106 to add received fragment information to the file/repository.

FIG. 12 is a flowchart illustrating operation of a peer-to-peer client moving a background file download to the foreground using a file/repository in accordance with an illustrative embodiment. Operation begins when a user requests to move a background file download to the foreground. The P2P client downloads the torrent file (block 1202). Then, the P2P client queries the file/repository for needed file fragments stored locally (block 1204). The P2P client determines whether the full file is obtained and stored locally (block 1210). If the full file is stored locally, operation ends.

If the full file is not obtained and stored locally in block 1210, the P2P client sends a request to a tracker for a peer list (block 1214). The P2P client then exchanges messages with peers to request, respond, and exchange data (block 1216). Next, the P2P client determines whether the full file is obtained (block 1218). If the full file is obtained, operation ends. If, however, the full file is not obtained in block 1218, operation returns to block 1216 to exchange messages with peers to request, respond, and exchange data.

Thus, the illustrative embodiments solve the disadvantages of the prior art by providing a peer-to-peer file sharing client with background file sharing in a segmented peer-to-peer file sharing network. Each file sharing participant may designate an amount of bandwidth and/or storage space for background file sharing. Peer-to-peer file sharing clients then share file data and content in the background automatically. The client may participate in additional swarms, in the background, to generally increase the number of peers in file sharing networks, thus increasing the speed of downloading desired files for other users.

In accordance with one illustrative embodiment, when a file is moved from the background to the foreground in a peer-to-peer client, the client makes a local request for file pieces. The client sends a handshake message to itself to check for available pieces. The client then exchanges messages locally the same way it would with external peers. As an alternative approach to local message passing, the client may keep a local record of file fragments in a data structure, such as a markup language document or other data repository. The client may then query the data structure for needed file fragments before submitting a request to the peer-to-peer network. Every time a new file segment is downloaded and validated in the background, or the foreground, the peer-to-peer client may update the data structure. Then, the client may simply query the data structure for the specific segment it wishes to download.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Still further, the illustrative embodiments may take the form of a communications system comprising a transmitter that is configured to transmit program code for use by or in connection with a computer or any instruction execution system. For the purposes of this description, the transmitter may comprise, for example, a wireless router, a wireless access point, a wireless transmitter, a radio transmitter, a relay device, or any other transmission device that is configured to communicate, propagate, or transport the program for use by or in connection with the instruction execution system, apparatus, or device. For example, the communications system may be a relay that receives a wired or wireless transmission and propagates the transmission to another point in a communications network. The communications system may further comprise a memory that stores the computer readable program to be transmitted. The memory may be a transitory memory device, such as a volatile memory, serving as a buffer to temporarily store the computer readable program while it is being queued for transmission. Alternatively, the memory may be a more permanent memory device, such as a non-volatile memory, hard disk drive, or the like. The communications system may further comprise a receiver to receive the computer readable program before propagating or relaying transmission to another node in the network.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a peer-to-peer file sharing client device for moving a file from background file sharing to foreground file sharing and preventing duplicate downloads in a peer-to-peer file sharing network, the method comprising:
receiving, by the peer-to-peer file sharing client device, at least one file fragment of a file from a background swarm for background file sharing;
responsive to a user-generated request to move the file from background file sharing to foreground file sharing, identifying, by the peer-to-peer file sharing client device, the at least one file fragment stored locally; and
requesting, by the peer-to-peer file sharing client device, at least one remaining file fragment from the background swarm, wherein the background swarm becomes a foreground swarm, wherein requesting at least one remaining file fragment from the background swarm comprises sending a request to a tracker for a peer list.

2. The method of claim 1, wherein identifying the at least one file fragment stored locally comprises:
initiating a local request for file fragments;
sending a handshake message to self to check for available file fragments; and
exchanging messages to self to request and respond for the at least one file fragment stored locally.

3. The method of claim 1, further comprising:
responsive to receiving a given file fragment of the file from the background swarm, storing an identification of the given file fragment in a data structure.

4. The method of claim 3, wherein identifying the at least one file fragment stored locally comprises:
examining the data structure for file fragments identified as being stored locally.

5. The method of claim 3, wherein the data structure is a markup language document.

6. The method of claim 1, wherein requesting at least one remaining file fragment from the background swarm further comprises exchanging messages with peers to request, respond, and exchange data for the at least one remaining file fragment.

7. A peer-to-peer file sharing client for moving a file from background file sharing to foreground file sharing and preventing duplicate downloads in a peer-to-peer file sharing network, the peer-to-peer file sharing client comprising:
a processor; and
a memory, wherein the memory contains instructions which, when executed by the processor, cause the processor to:
receive at least one file fragment of a file from a background swarm for background file sharing;
responsive to a user-generated request to move the file from background file sharing to foreground file sharing, identify the at least one file fragment stored locally; and
request at least one remaining file fragment from the background swarm, wherein the background swarm becomes a foreground swarm, wherein requesting at least one remaining file fragment from the background swarm comprises sending a request to a tracker for a peer list.

8. The peer-to-peer file sharing client of claim 7, wherein identifying the at least one file fragment stored locally comprises:
initiating a local request for file fragments;
sending a handshake message to self to check for available file fragments; and
exchanging messages to self to request and respond for the at least one file fragment stored locally.

9. The peer-to-peer file sharing client of claim 7, wherein the memory contains instructions which, when executed by the processor, further causes the processor to:
responsive to receiving a given file fragment of the file from the background swarm, store an identification of the given file fragment in a data structure.

10. The peer-to-peer file sharing client of claim 9, wherein identifying the at least one file fragment stored locally comprises:
examining the data structure for file fragments identified as being stored locally.

11. The peer-to-peer file sharing client of claim 9, wherein the data structure is a markup language document.

12. The peer-to-peer file sharing client of claim 7, wherein requesting at least one remaining file fragment from the background swarm further comprises exchanging messages with peers to request, respond, and exchange data for the at least one remaining file fragment.

13. A computer program product comprising a computer recordable medium having a computer readable program, wherein the computer readable program, when executed on a computing device, causes the computing device to:
receive at least one file fragment of a file from a background swarm for background file sharing;
responsive to a user-generated request to move the file from background file sharing to foreground file sharing, identify the at least one file fragment stored locally; and
request at least one remaining file fragment from the background swarm, wherein the background swarm becomes a foreground swarm, wherein requesting at least one remaining file fragment from the background swarm comprises sending a request to a tracker for a peer list.

14. The computer program product of claim 13, wherein identifying the at least one file fragment stored locally comprises:
initiating a local request for file fragments;
sending a handshake message to self to check for available file fragments; and
exchanging messages to self to request and respond for the at least one file fragment stored locally.

15. The computer program product of claim 13, wherein the computer readable program, when executed on the computing device, further causes the computing device to:
responsive to receiving a given file fragment of the file from the background swarm, store an identification of the given file fragment in a data structure.

16. The computer program product of claim 15, wherein identifying the at least one file fragment stored locally comprises:
examining the data structure for file fragments identified as being stored locally.

17. The computer program product of claim 13, wherein requesting at least one remaining file fragment from the background swarm further comprises exchanging messages with peers to request, respond, and exchange data for the at least one remaining file fragment.

* * * * *